Patented Dec. 3, 1929

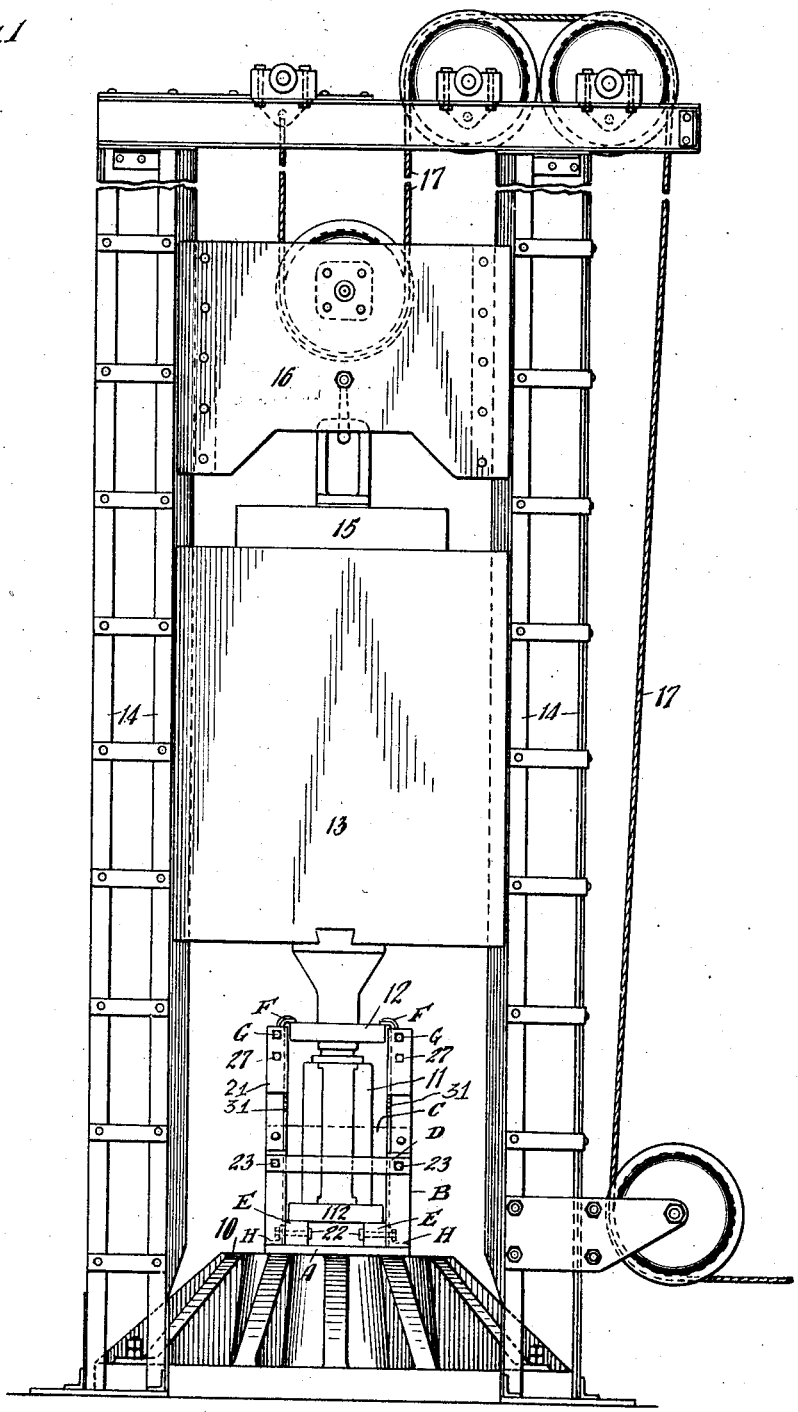

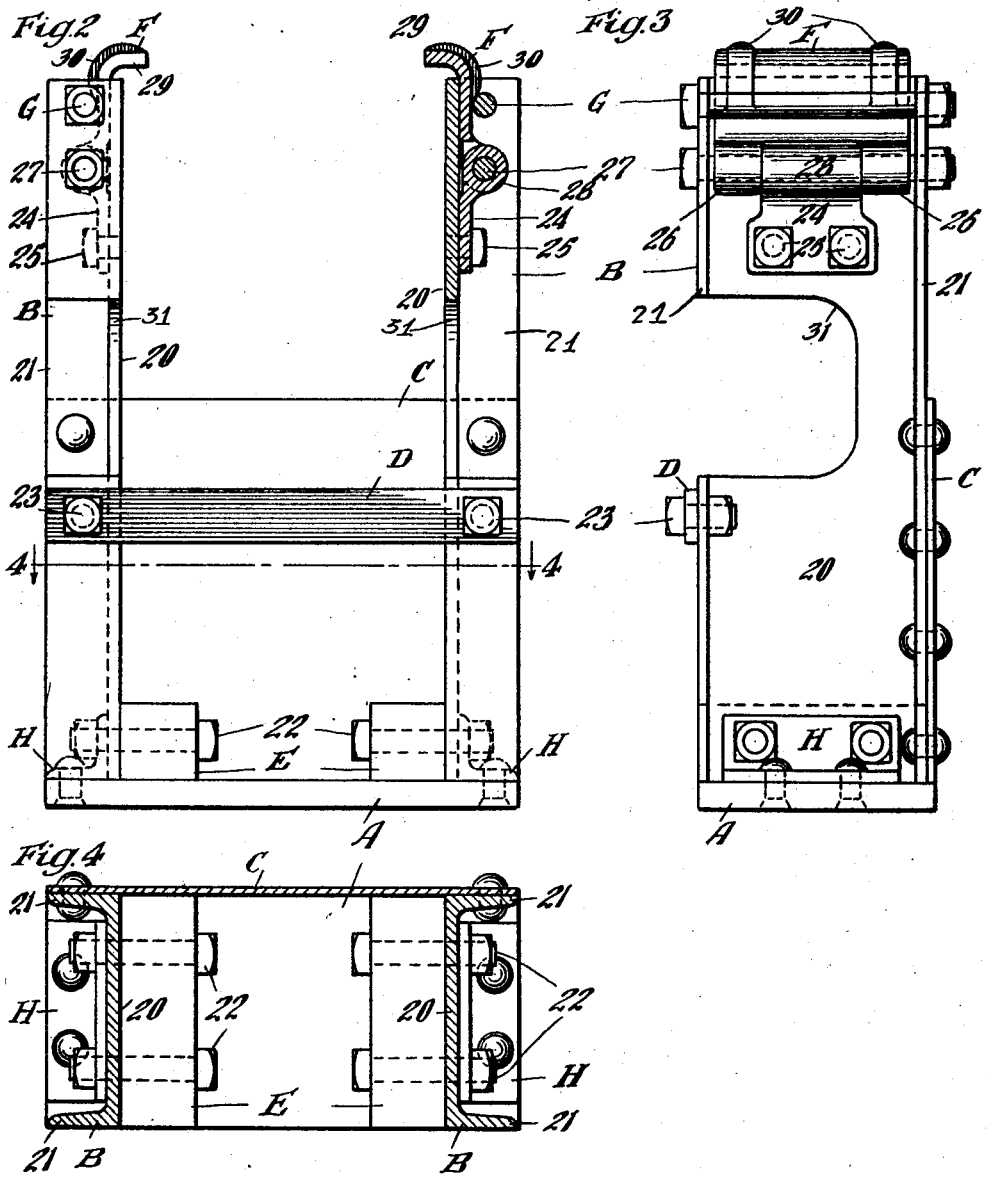

1,737,565

UNITED STATES PATENT OFFICE

ARILD M. BRENNE, OF CHICAGO, ILLINOIS, ASSIGNOR TO W. H. MINER, INC., OF CHICAGO, ILLINOIS, A CORPORATION OF DELAWARE

TESTING FRAME

Application filed September 17, 1925. Serial No. 56,934.

This invention relates to improvements in testing frames.

As is well known, a common manner of testing draft gears for railway cars is by means of a heavy drop hammer which is elevated to different heights and dropped on the gear, the gear while tested being supported on a suitable anvil. In order to facilitate the testing operation, it has been found desirable to provide means for retaining and holding the gear in proper position on the anvil of the testing apparatus.

One object of the invention is to provide a retaining means, for holding a draft gear in position while being submitted to the drop hammer test, in the form of a frame-work of simple design in which the gear is seated.

A further object of the invention is to provide a testing frame for the purpose specified, including adjustable means for retaining the gear in the frame.

Another object of the invention is to provide a testing frame for the purpose specified having means thereon representing the usual front and rear sets of stop lugs of a draft rigging, wherein the means representing one set of stop lugs is adjustable from the position in which the same co-operates with the gear to a position to permit of insertion of the gear in the frame, together with means for locking the adjustable means in operative relation to the gear.

Other objects and advantages of the invention will more fully and clearly appear from the description and claims hereinafter following.

In the drawings, forming a part of this specification, Figure 1 is an elevational view of a drop hammer such as is used in testing railway draft gears, showing my improvements in connection therewith. Figure 2 is a front, elevational view, partly in section, of the improved testing frame. Figure 3 is a side elevational view of the frame shown in Figure 2. And Figure 4 is a horizontal, sectional view corresponding substantially to the line 4—4 of Figure 2.

In said drawings, 10 denotes an anvil on which is placed the testing frame illustrated in detail in Figures 2, 3 and 4, containing the gear 11 to be tested. On top of the gear 11 is usually placed a follower 12 by which the blow is transmitted from the vertically movable 9,000 lb. weight 13. The gear is supported on the usual follower 112 if of the type employing a rear follower in service, otherwise it rests directly on anvil blocks E—E. The weight 13 is guided in its vertical movements by suitably heavy side guides 14—14. The weight is lifted by means of an electro-magnet 15 carried by a cross-head 16, which is also guided by the guide members 14. The cross-head 16 is elevated by means of a cable 17 which runs over suitable pulleys to a motor (not shown). When the weighted hammer 13 has been lifted the required distance through the cross-head 16 and the magnet 15, the current in the electro-magnet is shut off thereby releasing the weight of the hammer and permitting it to fall.

The improved testing frame, as shown, comprises broadly a base plate A; a pair of channel side members B—B; a tie plate C; a tie strap D; a pair of anvil blocks E—E; a pair of adjustable retaining lugs F—F; a pair of locking bolts G—G; and a pair of reinforcing angles H—H.

The base A of the testing frame is in the form of a relatively heavy substantially rectangular plate having the upright channel members B rigidly secured thereto, through the medium of the reinforcing angle plates H, which are fixedly secured to the base plate A by any suitable means, preferably rivets as shown.

The upright channel members B each comprise a relatively wide, plate-like section 20 having outwardly projecting flanges 21—21 at the opposite vertical side edges thereof. The anvil blocks E are directly supported on the base plate A and are secured to the respective side members B by bolts 22 which extend through the blocks E, the channel members B and the vertical flanges of the corresponding angle members H. As most clearly shown in Figure 4, the anvil blocks E are preferably of such a length as to correspond to the width of the channel members B. The channel members B are spaced apart a distance corresponding substantially to the standard spacing between the usual channel shaped center or draft sills of a railway car underframe and the anvil blocks E correspond to the usual rear stop lugs or abutments of the draft sills.

The two channel members B are rigidly united by the tie plate C and the tie strap D. The tie plate C forms the back wall of the testing frame and extends from the base plate A to substantially the center of the side members B. The plate C is rigidly secured to the rear set of flanges 21 of the members B in any suitable manner, preferably by a series of rivets as most clearly shown in Figures 3 and 4. The tie strap D is in the form of an elongated rectangular bar and has its opposite ends secured to the corresponding flanges 21 at the forward side of the members B. The opposite ends of the tie strap are preferably secured to the flanges 21 by bolts 23—23. It will thus be seen that the tie plate D is detachable upon removal of the bolts to thereby permit insertion of a draft gear through the front of the testing frame.

At the upper end, each channel member B is provided with a hinge bracket plate 24 suitably secured to the corresponding section 20 of the member B by means of a pair of cap screws 25—25. To each hinge plate 24 is hinged one of the retaining lugs F, each lug F being provided with a pair of hinge eyes 26—26 adapted to accommodate a hinge bolt 27 extending through an eye 28 formed in the hinge plate 24. As most clearly shown in Figure 3, the hinge bolt 27 is of such a length as to extend through the side flanges 21 of the corresponding channel member B, the flanges 21 of said member being provided with suitable openings to receive the bolt. It will be evident that additional rigidity for the pivot connection is provided by thus anchoring the bolt to the flanges 21 of the channel member B.

Each of the adjustable retaining lugs F is preferably in the form of a hooked member as most clearly illustrated in Figure 2, the hooked portion 29 of each lug being adapted to overhang the inner side of the corresponding side member and represent the usual corresponding front stop lug or abutment of the draft rigging. Inasmuch as the hooked retaining members are hinged to the side members B, the same may be swung outwardly to provide sufficient clearance for the insertion of the gear through the top of the testing frame.

As shown in Figure 2, the hooked member 29 of each retaining lug F is reinforced by a central web 30. In order to lock the retaining lugs F into operative, fixed position, each member B is provided with a detachable retaining bolt G at the upper end thereof, the flanges 21 of the channel members B being provided with aligned openings adapted to accommodate the corresponding bolt G and the bolt in turn being adapted to engage and bear on the outer side of the corresponding retaining lug F.

As hereinbefore pointed out, the channel members are spaced apart the same distance as the usual draft sills of a railway car underframe, the blocks E and the lugs F corresponding in position to the usual rear and front stop lugs of a railway draft rigging.

Certain gears commonly used on railway cars, are provided with springs and bolts which project from the sides thereof and are accommodated in openings provided in the draft sills. In order to accommodate the testing frame hereinbefore described to gears of this type, the side members B are recessed as indicated at 31. As shown each recess opens through the front side of the member B so that the gear may be readily inserted for testing purposes.

In testing a gear of the usual type, the same is entered through the top of the testing frame, it being unnecessary in this instance to remove the detachable tie strap D, the locking bolts G being first removed and the retaining lugs F swung outwardly to inoperative position so as to clear the inner planes of the members B. The follower plate 112 on which the gear is supported rests on the blocks E. The follower plate 12 is then placed on top of the gear and the retaining lugs F swung inwardly into overhanging position with reference to the last named follower plate. The locking bolts are then placed in position as shown in Figures 2 and 3. The testing frame, with the gear therein, is then placed on the anvil 10. In testing gears of the type having side projecting springs and bolts as hereinbefore pointed out, it is necessary to remove the tie plate D when placing the gear in the frame, the gear being entered through the front thereof.

While I have herein shown and described what I now consider the preferred manner of carrying out my invention, the same is merely illustrative, and I contemplate all changes and modifications that come within the scope of the claims appended hereto.

I claim:

1. In a testing frame for draft gears, the combination with a base; of a pair of spaced side members carried by said base and adapted to accommodate a draft gear therebetween; and laterally spaced abutments projecting from the adjacent faces of said side members at the opposite ends thereof, said abutments being adapted to correspond to the front and rear stop lugs of a standard railway draft rigging.

2. In a testing frame, the combination with spaced, parallel side members; of means for rigidly connecting said side members; and abutment elements at opposite ends of each of said side members, said abutment elements of each member projecting inwardly and being spaced apart a distance equal to the spacing of the usual stop lugs of a standard railway draft rigging, and adapted to correspond to the usual front and rear stop lugs of said draft rigging, one of said sets of abutment elements being displaceable to permit insertion of a draft gear in the frame; and means for locking said displaceable elements in fixed position.

3. In a testing frame, the combination with spaced side members; of means for rigidly connecting said members between the ends thereof, including a detachable strap; and abutment elements projecting laterally inwardly from said side members at opposite ends thereof, said abutment elements being adapted to correspond to the front and rear stop lugs of a standard railway draft rigging.

4. In a testing frame, the combination with spaced side members; of means for rigidly connecting said members, including a detachable strap; abutment elements at the opposite ends of each of said members, projecting from the inner faces of said members and adapted to correspond to the front and rear stop lugs of a railway draft rigging, the abutment elements at one end of said members being displaceable; and locking means for said displaceable elements.

5. In a testing frame, the combination with spaced side members adapted to accommodate a draft gear therebetween; of means for rigidly connecting said side members; a pair of laterally spaced abutment blocks at one end of said frame, each of said blocks being fixed to one of said side members and projecting laterally inwardly therefrom; a pair of laterally spaced hooks at the opposite end of said frame, one of said hooks being hinged to each of said side members, said hooks normally projecting laterally inwardly from said side members; and locking means for said hooks, said hooks and blocks being spaced apart a distance corresponding to the front and rear stop lugs of draft sills of a standard railway draft rigging.

6. In a testing frame, the combination with a base plate; of upright spaced side members fixed to the base plate; cross-tie members rigidly connecting said side members; a pair of laterally spaced abutment blocks supported by said base plate and fixed to the side members on the inner sides thereof and projecting therefrom; a pair of spaced displaceable combined retaining and abutment elements at the upper end of said frame, said elements being connected to the side members and projecting laterally inwardly from said side members; and means for locking said elements in fixed position, said retaining elements and blocks being spaced apart a distance corresponding to the spacing of the front and rear stop lugs of draft sills of standard railway draft riggings.

In witness that I claim the foregoing I have hereunto subscribed my name this 14th day of September 1925.

ARILD M. BRENNE.